(12) United States Patent
de Jong et al.

(10) Patent No.: US 7,572,066 B2
(45) Date of Patent: Aug. 11, 2009

(54) TRANSLUCENT DUST CAP FOR FIBER OPTIC ADAPTER

(75) Inventors: Michael de Jong, Colleyville, TX (US); Gerry J. Harvey, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 34 days.

(21) Appl. No.: 11/374,679

(22) Filed: Mar. 14, 2006

(65) Prior Publication Data

US 2007/0217749 A1    Sep. 20, 2007

(51) Int. Cl.
G02B 6/36 (2006.01)
(52) U.S. Cl. .............................. 385/88; 385/39; 385/72
(58) Field of Classification Search .................. 385/88, 385/31, 33, 39, 47, 134, 147, 53, 140; 439/144
See application file for complete search history.

(56) References Cited

U.S. PATENT DOCUMENTS

| | | | | |
|---|---|---|---|---|
| 4,295,185 A * | 10/1981 | Martin | ........................ | 362/211 |
| 5,138,676 A | 8/1992 | Stowe et al. | ................... | 385/32 |
| 5,452,393 A | 9/1995 | Stowe et al. | ................ | 385/123 |
| 5,506,922 A * | 4/1996 | Grois et al. | ................... | 385/75 |
| 5,537,164 A * | 7/1996 | Smith | .......................... | 351/219 |
| 6,004,043 A | 12/1999 | Abendschein et al. | ......... | 385/76 |
| 6,079,881 A | 6/2000 | Roth | ............................. | 385/76 |
| 6,081,647 A | 6/2000 | Roth et al. | ................... | 385/139 |
| 6,108,482 A | 8/2000 | Roth | ........................... | 385/139 |
| 6,227,717 B1 | 5/2001 | Ott et al. | ....................... | 385/53 |
| 6,425,694 B1 | 7/2002 | Szilagyi et al. | ................ | 385/76 |
| 6,471,412 B1 * | 10/2002 | Belenkiy et al. | ............... | 385/53 |
| 6,554,485 B1 | 4/2003 | Beatty et al. | .................... | 385/72 |
| 6,572,274 B1 | 6/2003 | Margaliot et al. | ............. | 385/75 |
| 6,599,033 B1 * | 7/2003 | Pohnke | ......................... | 385/94 |
| 6,612,753 B1 | 9/2003 | Cryan et al. | ................... | 385/96 |
| 6,678,449 B2 | 1/2004 | Thompson et al. | .......... | 385/114 |
| 6,685,362 B2 * | 2/2004 | Burkholder et al. | ........... | 385/78 |
| 6,712,524 B2 | 3/2004 | Beatty et al. | ................... | 385/72 |
| 6,715,930 B2 * | 4/2004 | McBride | ....................... | 385/73 |
| 6,718,561 B2 * | 4/2004 | Dondero | ........................ | 2/436 |
| 6,848,833 B1 * | 2/2005 | Kamarauskas et al. | ........ | 385/55 |
| 2002/0102063 A1 * | 8/2002 | Kiani | ........................... | 385/53 |
| 2003/0002810 A1 * | 1/2003 | Cheng | ........................... | 385/76 |
| 2003/0099442 A1 * | 5/2003 | Cheng | ........................... | 385/76 |
| 2003/0123812 A1 | 7/2003 | Beatty et al. | | |
| 2004/0146254 A1 | 7/2004 | Morrison | ..................... | 385/100 |
| 2004/0218872 A1 | 11/2004 | Low | ............................. | 385/60 |
| 2005/0094947 A1 | 5/2005 | James, IV et al. | ............. | 385/88 |
| 2005/0135772 A1 | 6/2005 | Nield et al. | .................. | 385/140 |
| 2005/0220434 A1 * | 10/2005 | Hsieh | .......................... | 385/134 |
| 2006/0104578 A1 | 5/2006 | Herbst | | |
| 2006/0204200 A1 * | 9/2006 | Lampert et al. | ............. | 385/139 |
| 2007/0147741 A1 * | 6/2007 | Meek et al. | ..................... | 385/55 |

* cited by examiner

Primary Examiner—Daniel A Hess (57) ABSTRACT

A translucent dust cap for a fiber optic adapter allows the viewing of visible light emanating from a fiber optic connector coupled to the adapter, without removing the dust cap. A translucent dust cap for a fiber optic adapter that serves to diffuse a visible light source of sufficient power, such as that from a VFL, and lights up to aid in connector identification. A translucent dust cap for a fiber optic adapter that serves to attenuate infrared optical transmission power to prevent eye damage.

18 Claims, 7 Drawing Sheets

TRANSLUCENT DUST CAP FOR FIBER OPTIC ADAPTER

BACKGROUND OF THE INVENTION

1. Field of the Invention

The present invention relates generally to dust caps that are mounted upon fiber optic connector adapters and, more particularly, to translucent fiber optic adapter dust caps that allow the identification of light emanating from a fiber optic connector while the connector is capped or loaded into an adapter, while also providing protection against eye damage and dust contamination.

2. Technical Background

Fiber optic applications using optical connectors and adapters frequently include requirements for the identification of specific optical fibers during installation, interconnection and maintenance testing. Examples of such applications include local area networks, industrial networks and structured cabling systems, among others. Within these systems, connections between optical fibers are typically accomplished through the use of one or more patch panels. A patch panel typically includes a large number of optical connectors pre-installed into the backside of a number of connector adapters. The front side of the adapters are typically covered until needed using a dust cap operable for preventing dust from entering the adapter and contacting the polished end face of the back side connector. When a specific connector is needed for interconnection with a fiber optic jumper, a visible light source, commonly a red laser diode source from a Visual Fault Locator (VFL), is used to perform optical fiber tracing for connector identification.

With conventional connectors and adapters, it has been required that either the connectors must be removed from their respective adapters to allow for the visual identification of the visible light, or the adapter dust cap must be removed and the operator must peer into the adapter to view the visible light. In either case, the opportunity then exists for eye damage from the invisible light if a connector with infrared transmission laser power is viewed accidentally. Further, removing the connector from its respective adapter or removing the dust cap from the connector may also allow dust and contaminants to reach the polished end face of the ferrule, resulting in damage or signal degradation.

Conventional dust caps have typically been fabricated from opaque plastic materials, such as low-density polyethylene materials, due to the fact that they are primarily used for preventing contaminants from reaching the polished end face of the ferrule. Examples of such conventional opaque dust cap for use with ST and SC connectors are described in U.S. Pat. No. 6,227,717. Conventional dust caps have also been generally designed to be mounted directly upon a ferrule by inserting the front face of the ferrule through an open end of the dust cap, and have not been designed to be mounted to the connector adapter. Other conventional dust caps have been developed to allow for the identification of visible light without the removal of the dust cap from the ferrule, but do not allow for the identification of the visible light through the dust cap once the connector is loaded into an adapter, due to the fact that the dust cap must be removed from the ferrule prior to inserting the connector into the adapter. One example of such a translucent ferrule dust cap is described in U.S. Pat. No. 6,554,485 and includes a dust cap having a translucent end member that permits optical communication while the dust cap remains mounted upon a ferrule, thereby protecting the polished front face of the ferrule from contaminants. While these examples of conventional dust caps do prevent dust contamination and allow visible light identification in certain applications, by design they are not able to provide both protection against dust contamination and the ability to identify visible light emanating from the connector while the connector is loaded into an adapter. Exemplary applications in which connector loaded adapter identification may be useful include patch panels or outdoor stubbed fiber distribution hubs, among others.

Accordingly, what is desired is a translucent adapter dust cap that not only protects against dust contamination, but also allows for the viewing of light emanating from the connector while the connector is coupled to an adapter. Additionally, it would be desirable for the adapter dust cap to serve to diffuse a visible light source of sufficient power to cause eye damage if viewed along the optical axis (i.e., visible light from a visual fault locator). Further, it would be desirable for the adapter dust cap to serve to attenuate invisible infrared optical transmission power to prevent eye damage. Desirable translucent adapter dust caps may vary according to application and can be designed to accommodate various connector adapters, such as SC, LC, ST, and MU adapters, among others.

SUMMARY OF THE INVENTION

In one aspect, the present invention is directed to a translucent adapter dust cap that allows for the identification of visible light emanating from a fiber optic connector while the connector is loaded into an adapter, without removing the dust cap. In an exemplary application, the adapter may be disposed within a patch panel such that a connector is pre-installed into the back side of the adapter, and the translucent adapter dust cap is loaded into the front side of the adapter until an interconnection with a fiber optic connector of another fiber optic jumper is attempted. The translucent adapter dust cap is preferably designed such that it mates in a manner similar to a connector that would be loaded into the front side of the adapter, thus providing the best seal between the dust cap and the adapter. The dust cap is preferably made from a translucent plastic material and preferably includes a spot of paint or other opaque or absorbent material about the optical axis, thus preventing eye damage that may be caused by the visible or invisible light source. The internal geometry of the dust cap may function to reflect or diffuse a light source of sufficient power, such as that from a visual fault locator (VFL). Alternatively, a material may be chosen that absorbs damaging wavelengths of light.

In another aspect, the present invention is directed to a translucent adapter dust cap that not only addresses the identification shortcomings of other conventional dust caps, but also functions in an improved manner to further reduce the opportunity for contaminants and other debris to be deposited upon the polished front face of the ferrule. This is accomplished by allowing the dust cap to remain loaded into the adapter during identification and until the front side of the adapter is needed. Thus, the translucent adapter dust cap may be loaded into the adapter the entire time the connector is loaded into the back side of the adapter, until the front side of the adapter is needed for interconnection with another connector, reducing the time and opportunity for debris to enter the adapter. The translucent adapter dust cap is preferably constructed such that at least the closed end is translucent in order to permit the optical identification. In various embodiments, there may be a protrusion of the dust cap into the bore of the adapter towards the connector ferrule while providing a clearance for the connector ferrule. The dust cap preferably seals with the adapter when an interior surface of the dust cap substantially surrounds an internal feature of the adapter, thus providing a seal and preventing contaminants from reaching the polished end face of the connector ferrule.

In yet another aspect, the present invention is directed to a translucent adapter dust cap comprising a translucent door hingeably mounted to a connector adapter. As in the above embodiments, a connector is loaded into the back side of the adapter. When the front side of the adapter is not occupied by a connector, the dust cap door is positioned in a closed position substantially covering the front side end of the adapter. The dust cap door may be made, for example, from a polycarbonate or nylon material capable of diffusing visible or invisible light emanating from the back side connector ferrule. The dust cap door may further include an opaque portion, spot of paint or other light absorbing material about the optical axis in order to prevent eye damage that may occur by viewing the visible or invisible light along the optical axis. When the front side of the adapter is needed, the dust cap door is moved to the open position and preferably remains affixed to the adapter. The dust cap door is preferably spring loaded so that when the front side connector is removed from the adapter the dust cap door automatically closes against the front side end of adapter, thus providing a seal and preventing dust from entering the adapter. Various numbers of doors, door sizes, door shapes and methods of affixing the door to the adapter may vary based on application and adapter design.

Additional features and advantages of the invention are set forth in the detailed description which follows and will be readily apparent to those skilled in the art from that description, or will be readily recognized by practicing the invention as described in the detailed description, the drawings and the appended claims.

It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be merely illustrative, and are not intended to limit the scope of the claims in any manner.

DETAILED DESCRIPTION OF THE PREFERRED EMBODIMENTS

Reference will now be made in greater detail to various exemplary embodiments of the invention, preferred embodiments of which are illustrated in the accompanying drawings. Whenever possible, the same reference numerals will be used throughout the drawings to refer to the same or similar parts. Specific embodiments of translucent adapter dust caps operable for allowing the viewing of light emanating from a fiber optic connector while the connector is loaded into the adapter are shown throughout the figures. It should be understood, however, that alternative translucent adapter dust cap designs may vary in order to accommodate other fiber optic connector adapters, including, but not limited to, single fiber and multi-fiber versions of SC, ST, LC, FC MTP and MU connectors, among others. Alternative translucent adapter dust cap designs may also vary while still proving protection against dust contamination and blocking light transmitted along the optical axis.

Figure 1:
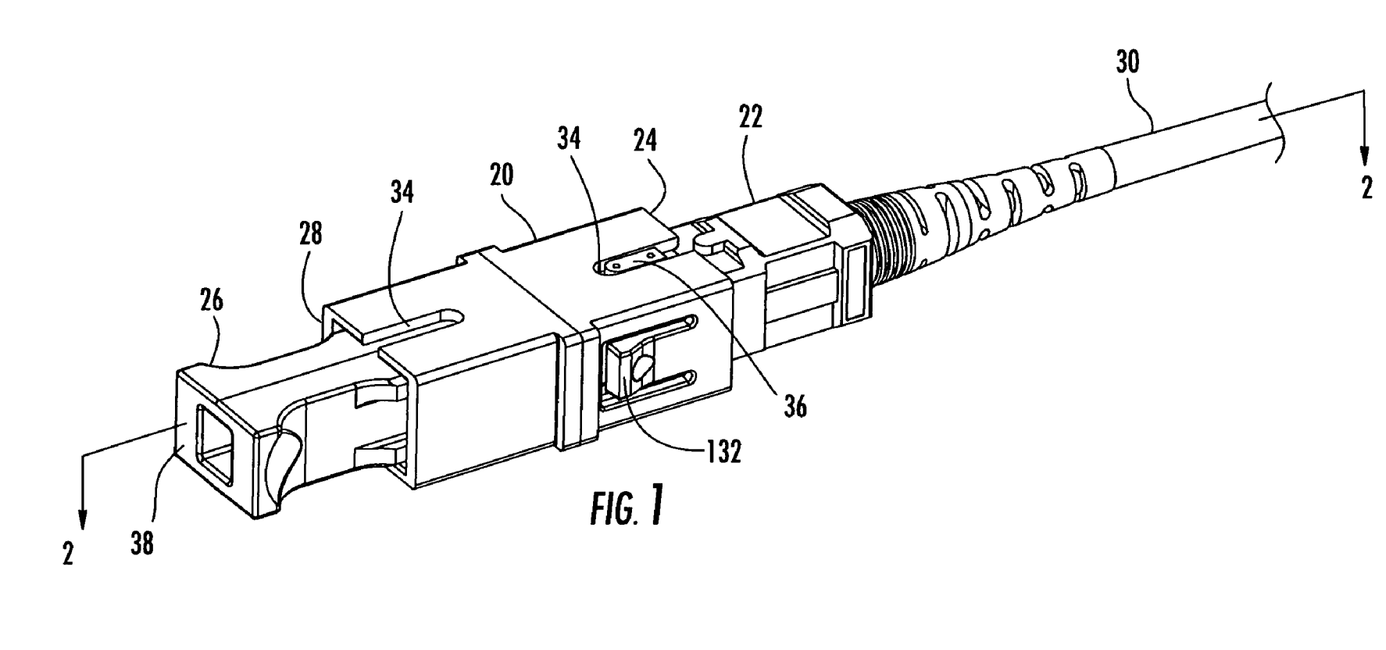
FIG. 1 is a perspective view of an adapter having a connector loaded into a back side of the adapter and a translucent adapter dust cap loaded into a front side of the adapter.

Referring now to FIG. 1, a connector adapter 20 is shown having a connector 22 loaded into a back side 24 of the adapter 20, and a translucent adapter dust cap 26 loaded into a front side 28 of the adapter. An optical fiber cable 30 is shown terminated with an SC connector 22 and loaded into an SC adapter 20 for exemplary purposes only, and designs may vary to accommodate other common connectors. In an exemplary application, the adapter 20 may be disposed within a patch panel such that the connector 22 is pre-installed into the back side of the adapter 20 ready for interconnection with a front side installed connector, such as a connector of a fiber optic jumper. The translucent adapter dust cap 26 is preferably loaded and fits within the adapter 20 in a manner similar to a connector loaded into the front side of the adapter, thus providing a seal substantially similar to a seal provided between the adapter 20 and a mating connector. Adapters may be held into the patch panel using a latch mechanism 132 or other method known in the art. A slot 34 defined by the adapter 20 fits a key 36 of the connector 22 to insure alignment with the adapter 20 and proper connector orientation. The dust cap 26 may define a key for insertion within the slot 34, however, as shown, proper dust cap orientation and a key is not required. As shown, the dust cap 26 defines a greater width than height, thus assuring proper insertion into the adapter 20. The dust cap 26 may be held in place using a latch or other mechanism or may be held in place by an interference fit. As will be described in more detail below, the dust cap 26 defines a viewing end 38 at which visible light emanating from the back side connector 22 causes the dust cap 26 to glow for detection by an operator or invisible light may otherwise be detected.

Figure 2:
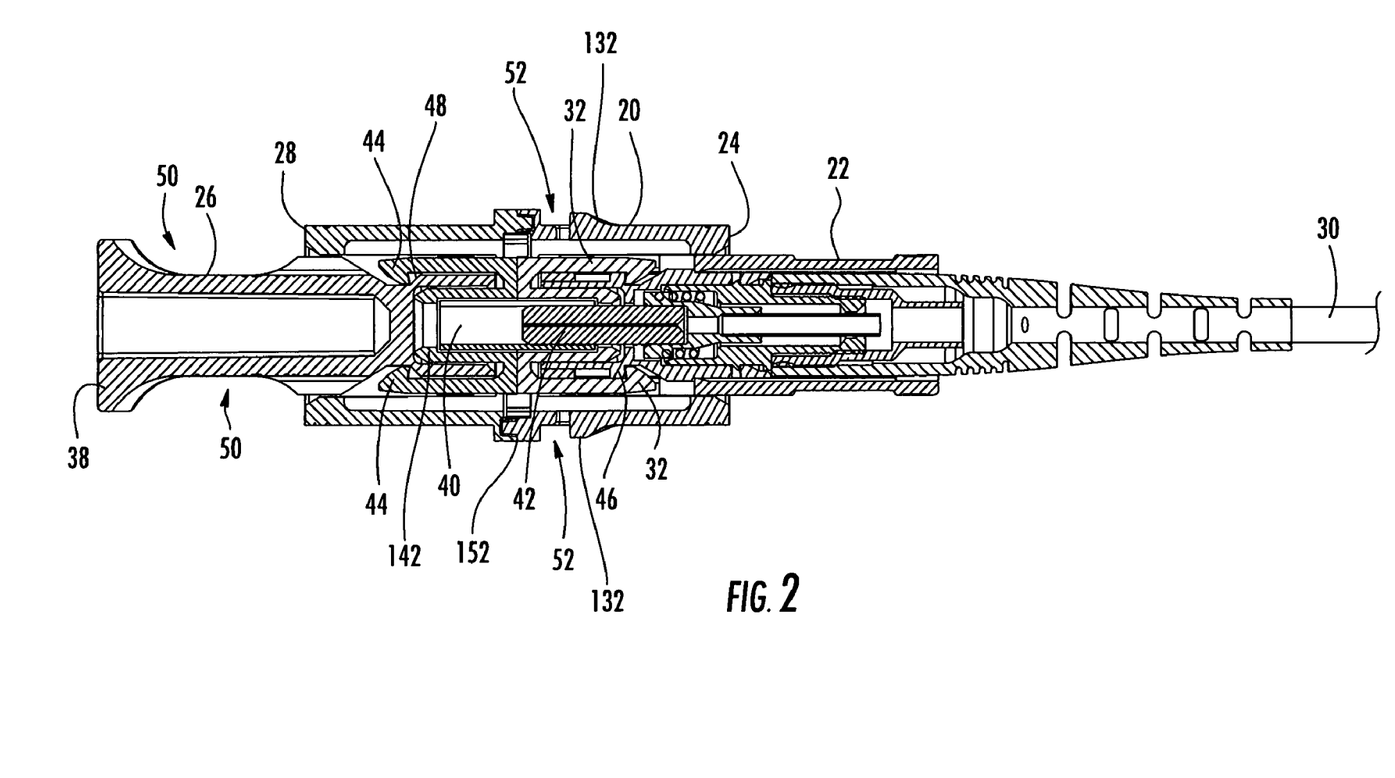
FIG. 2 is a cross-sectional view of FIG. 1 taken along line 2-2.

Referring to FIG. 2, a cross-sectional view of the assembly taken along line 2-2 is shown. The dust cap 26 defines a ferrule opening 40 about one end for receiving the ferrule 42 of the back side connector 22 or the mating geometry 142 of the adapter and is of sufficient length such that the polished end face of the ferrule 42 does not contact a surface of the dust cap 26. The interior of the adapter 20 defines a pair of flexible latch arms 32 that snap over flats 46 defined by the connector housing. To release the back side connector 22 from the adapter 20, the latch arms 32 are flexed outward to release. The interior of the adapter defines another set of flexible latch arms 44 that provide an interference fit with the dust cap 26. The dust cap 26 is held in place when the latch arms 44 interfere with a chamfer 48 defined by the dust cap 26. The dust cap 26 is shaped to provide a gripping surface 50 for gripping the dust cap 26 in order to load or remove the dust cap 26 from the adapter 20 by hand. Reference number 52 points to a slot formed between the flange 152 of the adapter 20 and the panel latch 132. A wall of an enclosure (not shown) or a patch panel may be secured within slot 52.

Figure 3:
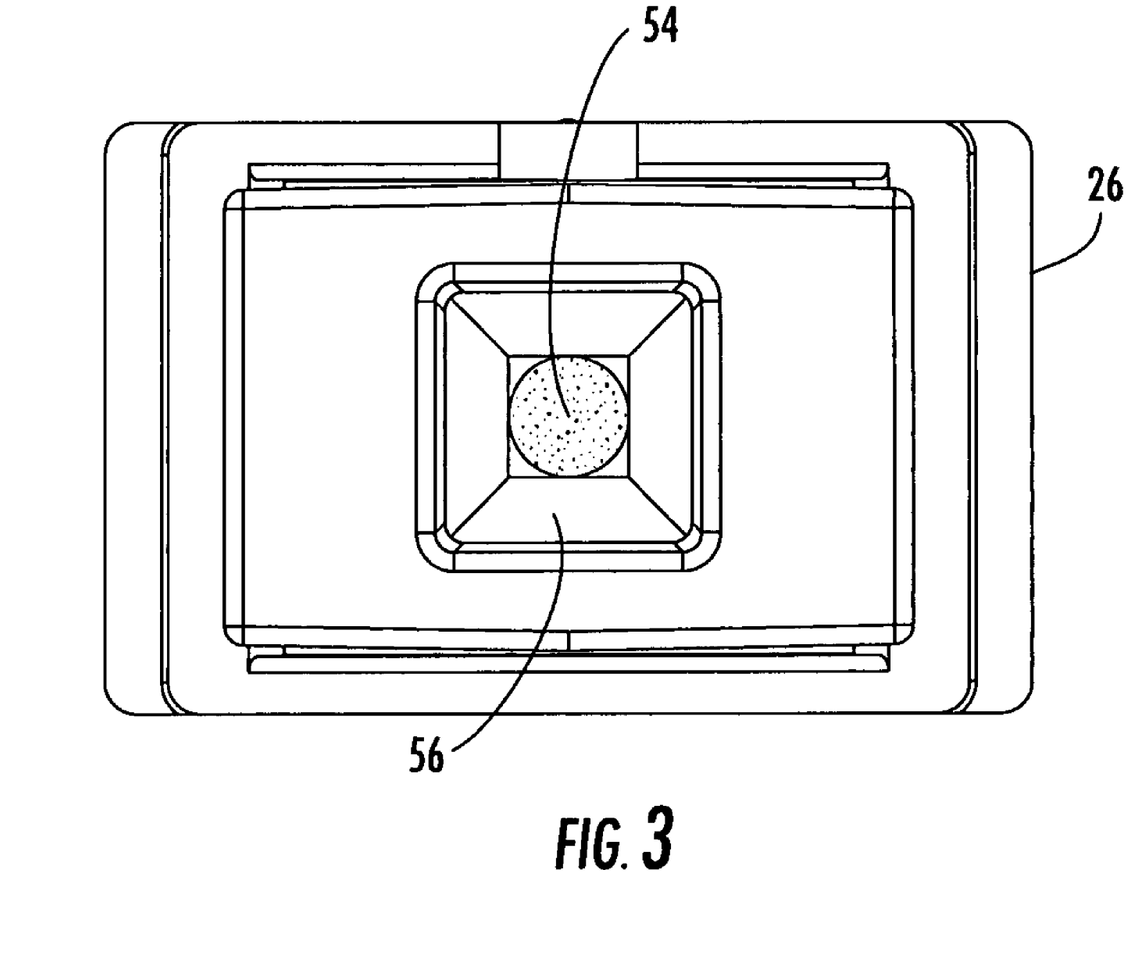
FIG. 3 is an end view of a translucent adapter dust cap illustrating a translucent portion for diffusing light and an opaque portion for blocking light along the optical axis.

Referring to FIG. 3, an end view of the translucent adapter dust cap 26 is shown to illustrate translucent portions for diffusing light and an opaque portion 54 for blocking light along the optical axis. To enhance laser eye safety, the opaque portion 54 may include an opaque disk or drop of paint inserted in the dust cap 26 in the optical path. VFL light emanating from the adapter 20 will illuminate the dust cap 26 as it refracts from the end of the unmated connector 22. Transmission power will also refract, and any centered modes will be blocked by the opaque portion 54. In a preferred embodiment, all portions of the dust cap 26 are made from a translucent material, such as a translucent polycarbonate or nylon, and glow when light emanates from the connector 22, except for the opaque portion 54 generally positioned about the center of the dust cap 26 along the optical axis. As stated above, the opaque material is preferably a spot of paint or other absorbent material for cost savings, but may be made from an opaque plastic or other material molded into the dust cap 26. The opaque portion 54 blocks light along the optical axis and prevents eye damage that may occur if the light is viewed with the dust cap 26 removed. The internal geometry of the dust cap 26 may include a plurality of angled surfaces or facets 56 in order to reflect the light away from the optical axis and diffuse it radially outwardly into the dust cap 26. The internal geometry of the dust cap 26 may function to reflect or diffuse a light source of sufficient power, such as that from a visual fault locator (VFL). Diffused light is detected through the translucent dust cap 26 so that it is not necessary to remove the dust cap 26 in order to detect the light, and it is also not necessary to remove the back side connector 22 from the adapter 20 in order to detect the light.

Figure 4:
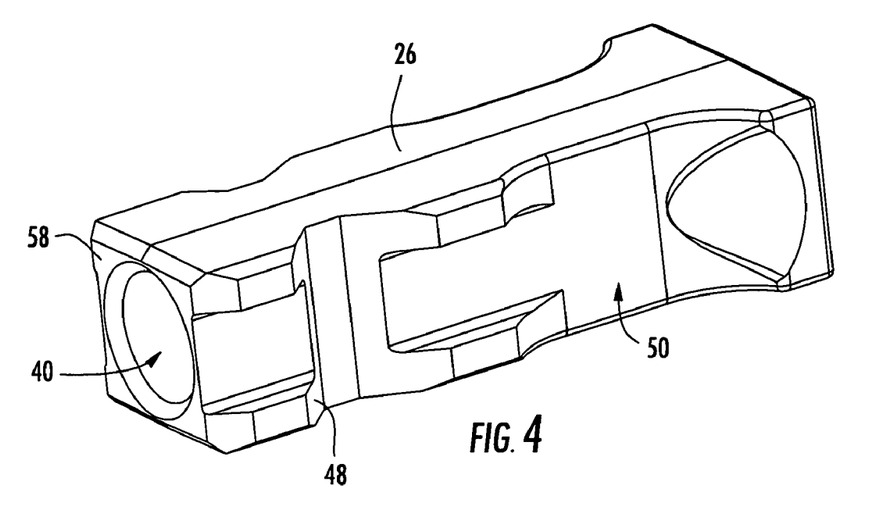
FIG. 4 is a perspective view of the translucent adapter dust cap detailing the ferrule insertion end of the dust cap.
Figure 5:
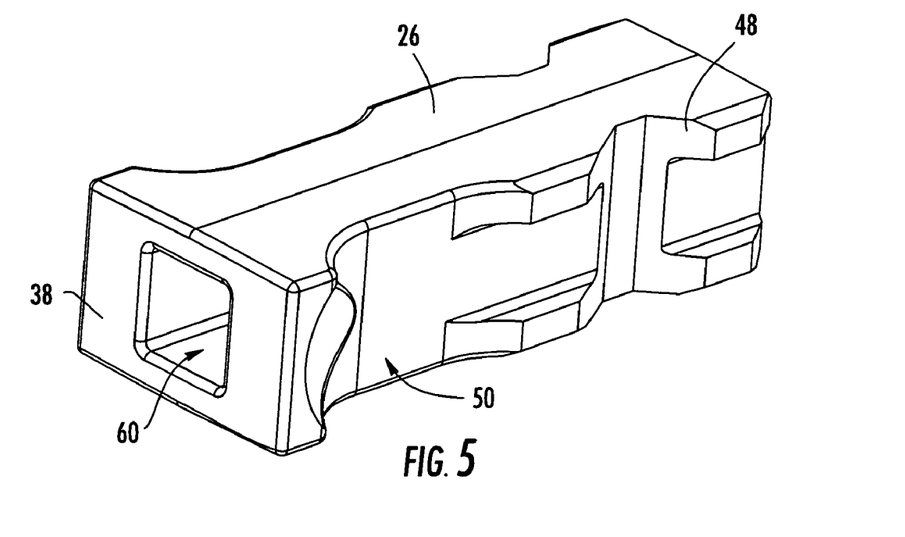
FIG. 5 is a perspective view of the translucent adapter dust cap detailing the light viewing end of the dust cap.
Figure 6:
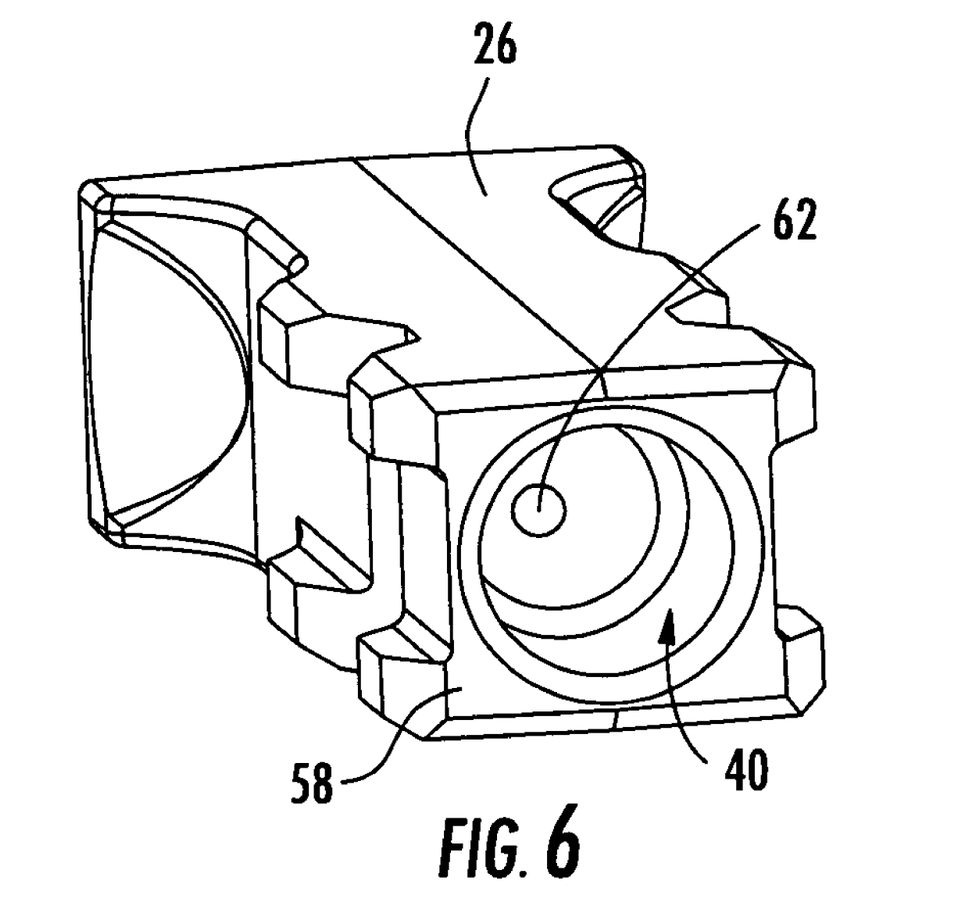
FIG. 6 is a perspective view of the translucent adapter dust cap further detailing the ferrule insertion end of the dust cap.

Referring to FIG. 4, a perspective view of the translucent adapter dust cap 26 detailing the ferrule insertion end 58, the ferrule opening 40, and the pulling surface 50 is shown. The ferrule opening 40 as shown is sized to interact with the internal geometry of the SC adapter for exemplary purposes only and may be sized differently to accommodate other single and multi-fiber ferrules. Referring to FIG. 5, a perspective view of the translucent adapter dust cap 26 detailing the optical communication end 38 and the pulling surface 50 is shown. The optical communication end 38 includes an opening 60 that serves to reduce the amount of material needed for the dust cap 26. Chamfers 48 are also shown for interfering with the hooks (not shown) on the interior of the adapter (not shown). Referring to FIG. 6, another perspective view of the ferrule insertion end 58 of the translucent dust cap 26 is shown to illustrate the optical transmission axis 62. The opaque paint or other absorbent material may be applied to this surface, but is preferably applied to the interior surface of opening 60.

Figure 7:
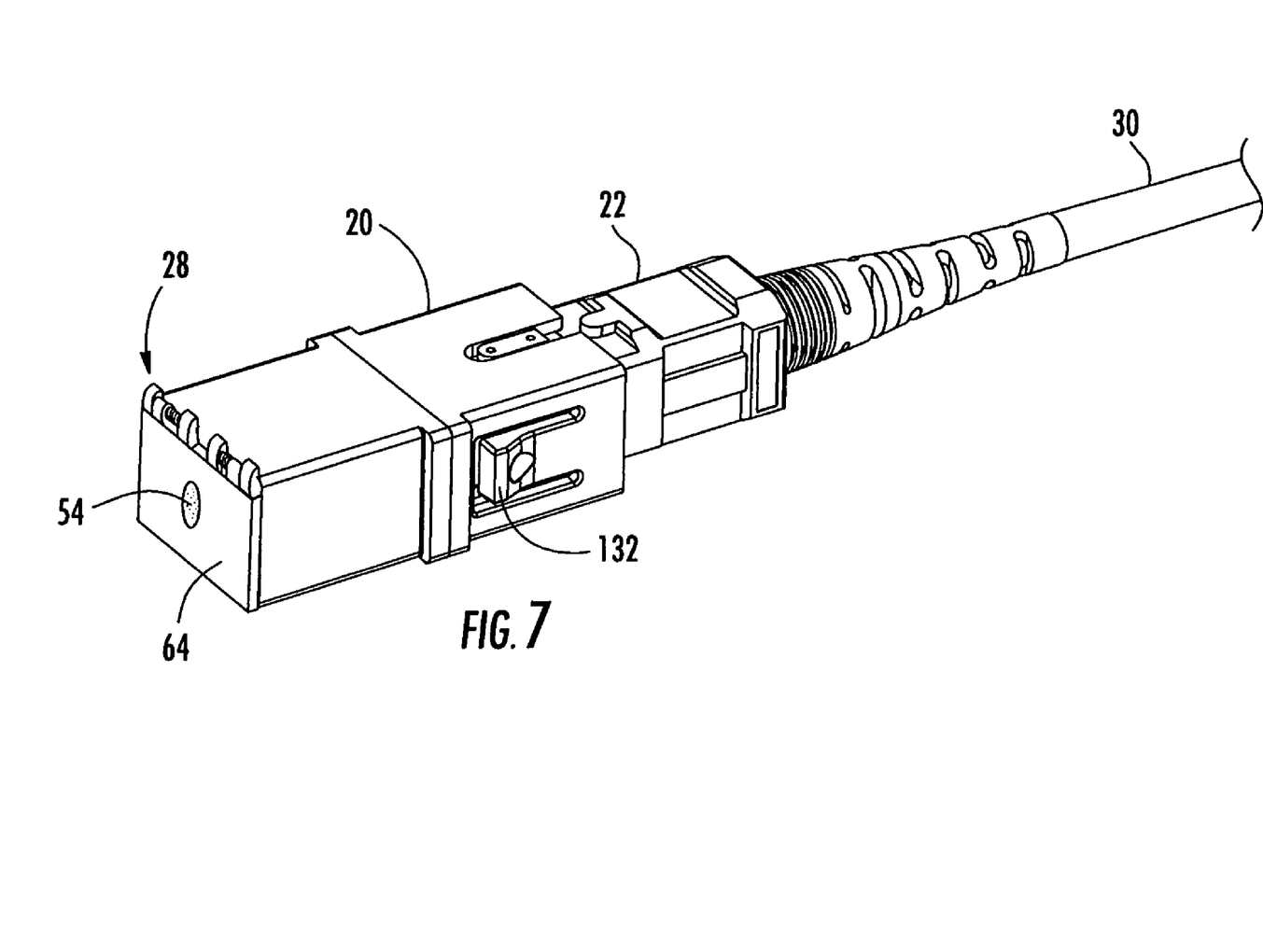
FIG. 7 is a perspective view of an adapter having a connector loaded into a back side of the adapter and a translucent adapter dust cap door positioned about the front side end of the adapter, wherein the door is shown in a closed position.
Figure 8:
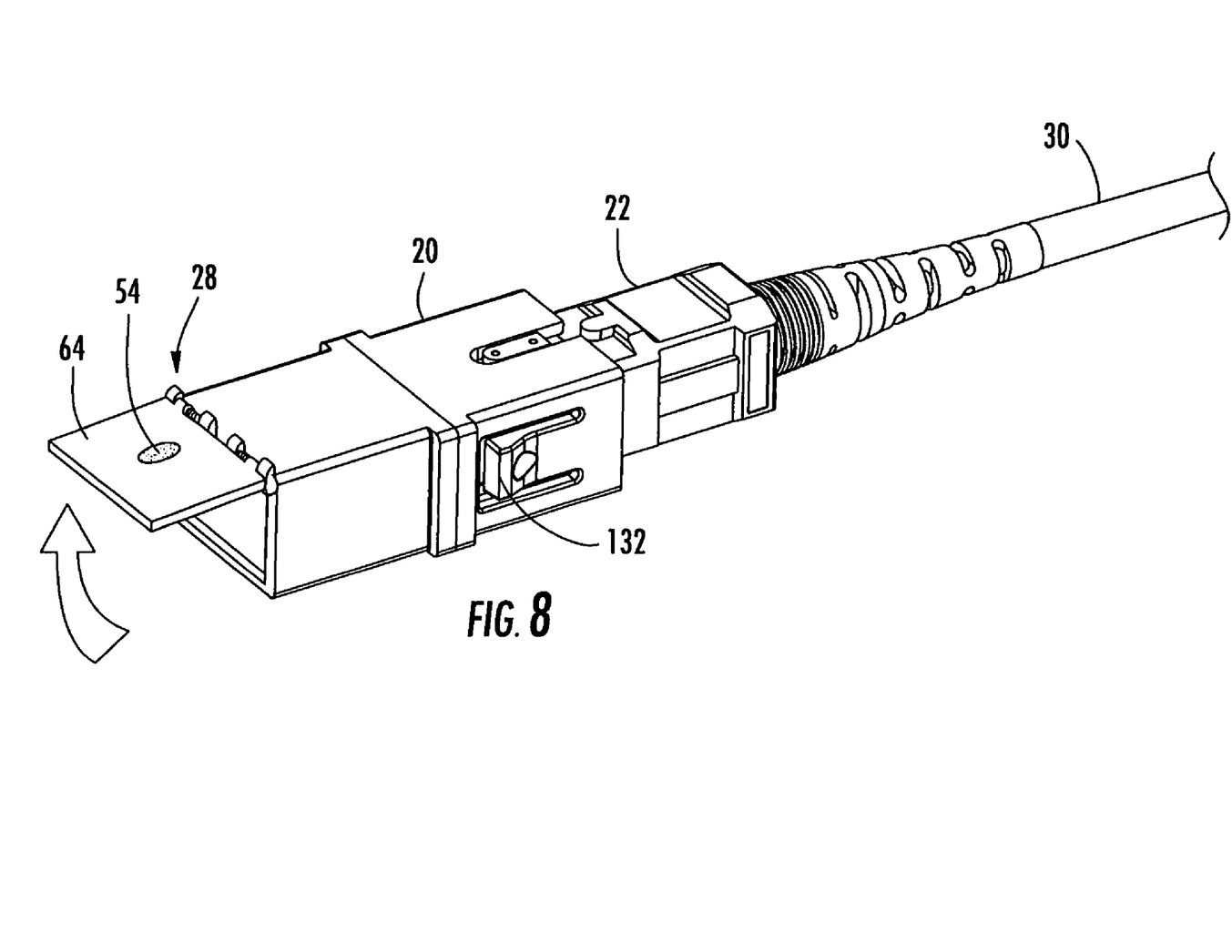
FIG. 8 is a perspective view of the translucent adapter dust cap door of FIG. 7 wherein the door is shown in an opened position.

Referring to FIGS. 7-8, a perspective view of an adapter 20 having a connector 22 loaded into a back side of the adapter 20 and an alternative embodiment of a translucent adapter dust cap door 64 positioned about the front side end 28 of the adapter 20 is shown. FIG. 7 shows the dust cap door 64 in a closed position, while FIG. 8 shows the dust cap door 64 in an opened position with a front side connector (not shown) not yet inserted into the adapter 20. The translucent adapter dust cap door 64 is preferably hingeably mounted to the connector adapter 20. As in the above embodiments, a connector 22 is loaded into the back side of the adapter. When the front side end 28 of the adapter 20 is not occupied by a connector, the dust cap door 64 is positioned in a closed position substantially covering the front side end 28 of the adapter 20. The dust cap door 64 is preferably made from a translucent plastic or nylon material such that is capable of diffusing visible or invisible light emanating from the back side connector ferrule. The dust cap door 64 further includes an opaque portion, spot of paint or other light absorbing material positioned generally about the optical axis in order to prevent eye damage that may occur by viewing the visible or invisible light along the optical axis. When the front side end 28 of the adapter 20 is needed, the dust cap door 64 is moved to the opened position and preferably remains affixed to the adapter 20. The dust cap door 64 is preferably spring loaded so that when the front side connector is removed from the adapter 20, the dust cap door automatically closes against the front side end 28 of adapter 20, thus providing a seal and preventing dust from entering the interior of the adapter 20. Various numbers of doors, door sizes, door shapes and methods of affixing the door to the adapter may vary based on application and adapter design, so long as a portion of the door is made from a translucent material and allows for the viewing of light emanating from the fiber optic connector 20 while the connector 20 is coupled to the adapter. Although not shown, the interior surface of the door 64 may define facets or another geometry for diffusing a light source of sufficient power (e.g., from a VFL). In alternative embodiments, the door 64 may open inwardly.

Light sources may include those capable of emitting visible and invisible light (e.g., infrared) that may be detected by the eye or using light detecting equipment. In the case of invisible light having a wavelength of about 1300 to about 1600 nm, the eye does react and the iris does not close, leading to possible retina damage. Visible light causes the translucent portions of the adapter dust caps to glow to aid in identification. In all embodiments, the dust cap material may be tailored to attenuate certain wavelengths and enhance the visibility of others, provided that optical signals can be transmitted therethrough. Although the dust caps can be formed of a variety of materials having different optical transmissivities, they are preferably formed of a material that is relatively optically clear. In one embodiment, for example, the dust caps may be formed of optically clear nylon 12 commercially available as TR90 Grilamid by EMS-Chemie, Inc., of Sumter, S.C. The dust caps are also preferably molded using a material that is relatively hard and does not shrink significantly following the molding process, such that the resulting dimensions of the dust cap may be precisely and consistently defined.

In alternative embodiments, the interior surface of the dust cap facing the connector ferrule may be frosted in order to enhance the dispersion of VFL output for improved visibility. The color of the translucent adapter dust cap may also be chosen to maximize the visibility of light of certain wavelengths, such as about a 600 nm VFL output. Colors may be matched to wavelength and include clear, yellow, rose, white, etc. In application, the various dust cap embodiments may be used to locate an adapter and unmated connector with a VFL attached to the other end of the unmated connector jumper so that the dust cap illuminates. The dust cap may further include a diffusion web that fits tightly over the mating features of the fiber optic adapter to block dust and dirt from reaching/collecting on the end face of the connector ferrule. The web preferably diffuses the VFL visible light energy so that the dust cap body illuminates. In addition to the ability to identify light emanating from the connector ferrule, the dust caps and dust doors are also designed to be mounted upon an adapter in order to protect the polished front face of the ferrule from contaminants and other debris.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. A translucent dust cap for a fiber optic connector adapter operable for allowing light emanating from a lit fiber optic connector loaded into the adapter to pass therethrough, and including a viewing end configured to cause the dust cap to glow to provide optical identification of the connector loaded into the adapter without removing the dust cap and an opaque portion on the dust cap positioned about an optical axis of the connector for blocking light traveling along the optical axis.

2. The translucent dust cap according to claim 1, wherein the dust cap diffuses light from a visible light source throughout the translucent body.

3. The translucent dust cap according to claim 1, wherein the dust cap is made from an optically clear material.

4. The translucent dust cap according to claim 1, wherein the opaque portion is a painted spot on the dust cap.

5. The translucent dust cap according to claim 1, wherein the dust cap is retained within the adapter by an interference fit.

6. The translucent dust cap according to claim 1, wherein the dust cap is retained within the adapter using one or more flexible latch arms.

7. The translucent dust cap according to claim 1, wherein the dust cap is one or more translucent doors including an opaque portion about the optical axis.

8. The translucent dust cap according to claim 1, wherein the dust cap defines an internal geometry for diffusing light trans mined along the optical axis radially outward into the dust cap.

9. The translucent dust cap according to claim 1, wherein the dust cap attenuates infrared optical transmission power.

10. A translucent dust cap for viewing visible light emanating from a fiber optic connector coupled to a fiber optic connector adapter including a viewing end configured to cause the dust cap to glow to provide optical identification of the connector loaded into the adapter without removing the dust cap, wherein a portion of the dust cap is covered with an opaque material operable for blocking light traveling along the optical axis of the fiber optic connector.

11. The translucent dust cap according to claim 10, wherein the opaque portion is a painted spot.

12. The translucent dust cap according to claim 10, wherein the dust cap comprises an internal geometry for diffusing the emanating light into the dust cap.

13. The translucent dust cap according to claim 10, wherein the adapter is secured within a patch panel.

14. The translucent dust cap according to claim 10, wherein the translucent adapter dust cap is made from an optically clear material.

15. The translucent dust cap according to claim 10, wherein the translucent adapter dust cap is retained within the adapter by an interference fit.

16. The translucent dust cap according to claim 10, wherein the translucent adapter dust cap is retained with the adapter by one or more flexible latch arms.

17. The translucent dust cap according to claim 10, wherein the translucent adapter dust cap includes one or more translucent doors hingeably affixed to the adapter.

18. The translucent dust cap according to claim 10, wherein the translucent adapter dust cap attenuates infrared optical transmission power.

* * * * *